US010852516B2

(12) United States Patent
Aihara et al.

(10) Patent No.: US 10,852,516 B2
(45) Date of Patent: *Dec. 1, 2020

(54) IMAGING DEVICE

(71) Applicant: Panasonic Intellectual Property Management Co., Ltd., Osaka (JP)

(72) Inventors: Masayuki Aihara, Osaka (JP); Shigenori Yatsuri, Osaka (JP); Yoshio Matsumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/442,463

(22) Filed: Jun. 15, 2019

(65) Prior Publication Data
US 2019/0302429 A1 Oct. 3, 2019

Related U.S. Application Data

(63) Continuation of application No. 15/854,797, filed on Dec. 27, 2017, now Pat. No. 10,365,462, which is a
(Continued)

(30) Foreign Application Priority Data

Aug. 12, 2016 (JP) ................................. 2016-158786

(51) Int. Cl.
*G02B 13/18* (2006.01)
*G01C 3/10* (2006.01)
(Continued)

(52) U.S. Cl.
CPC ............. *G02B 13/18* (2013.01); *G01B 11/24* (2013.01); *G01C 3/10* (2013.01); *G01C 11/02* (2013.01);
(Continued)

(58) Field of Classification Search
CPC .......... G02B 13/18; G02B 3/02; G02B 13/04; G02B 3/04; G02B 7/30; H04N 5/2254;
(Continued)

(56) References Cited

U.S. PATENT DOCUMENTS 6,873,358 B1 3/2005 Shimizu
2004/0169726 A1 9/2004 Moustier
(Continued)

FOREIGN PATENT DOCUMENTS

EP 3252514 A1 12/2017
JP 59-015239 1/1984
(Continued)

OTHER PUBLICATIONS

Patrice (Multi-task single lens for automotive vision applications, Proc. SPIE 7314, Photonics in the Transportation Industry: Auto to Aerospace II, 731409 (Apr. 29, 2009); doi: 10.1117/12.821296) (Year: 2009).*
(Continued)

*Primary Examiner* — Nasim N Nirjhar
(74) *Attorney, Agent, or Firm* — Renner, Otto, Boisselle & Sklar, LLP

(57) ABSTRACT

An imaging device having an optical system including a free-form surface lens with rotationally asymmetric shape that forms an image on an imaging surface such that a resolution of a first region in front of the predetermined region is higher than a resolution of a second region at a lateral side of the predetermined region. The free-form surface lens has a shape that forms the image such that a resolution of a portion at a predetermined first distance away from a center of the first region in a vertical direction is different from a resolution of a portion at the predetermined first distance away from the center of the first region in a horizontal direction, the vertical direction being orthogonal to the horizontal direction, in the imaging element, in which the first region and the second region are aligned.

4 Claims, 11 Drawing Sheets

Related U.S. Application Data continuation-in-part of application No. PCT/JP2017/028519, filed on Aug. 7, 2017.

(51) Int. Cl.
| | | |
|---|---|---|
| *H04N 5/225* | (2006.01) | |
| *G01C 11/06* | (2006.01) | |
| *G02B 13/00* | (2006.01) | |
| *G01B 11/24* | (2006.01) | |
| *G06T 7/55* | (2017.01) | |
| *G01C 11/02* | (2006.01) | |
| *G01C 11/30* | (2006.01) | |
| *G02B 3/02* | (2006.01) | |

(52) U.S. Cl.
CPC .............. *G01C 11/06* (2013.01); *G01C 11/30* (2013.01); *G02B 3/02* (2013.01); *G02B 13/0045* (2013.01); *G06T 7/55* (2017.01); *H04N 5/2254* (2013.01)

(58) Field of Classification Search
CPC .......... G01C 3/10; G01C 11/02; G01C 11/30; G06T 7/55
See application file for complete search history.

(56) References Cited

U.S. PATENT DOCUMENTS

| | | |
|---|---|---|
| 2011/0221767 A1 | 9/2011 | Kostrzewski et al. |
| 2011/0285973 A1 | 11/2011 | Togino |
| 2012/0327189 A1 | 12/2012 | Muramatsu et al. |
| 2013/0271597 A1 | 10/2013 | Kawamata et al. |
| 2015/0339825 A1 | 11/2015 | Muramatsu et al. |
| 2018/0150949 A1* | 5/2018 | Matono ................... G01C 3/06 |

FOREIGN PATENT DOCUMENTS

| | | |
|---|---|---|
| JP | 10-233950 | 9/1998 |
| JP | 2011-191905 A | 9/2011 |
| JP | 2014-192858 | 10/2014 |
| JP | 2016-126254 | 7/2016 |
| WO | WO 2012/011187 | 1/2012 |
| WO | WO 2016/121550 | 8/2016 |

OTHER PUBLICATIONS

Tae (Design of Off-axis Wide Angle Lens for the Automobile Application, Journal of the Optical Society of Korea, vol. 17, No. 4, Aug. 2013, pp. 336-343) (Year: 2013).*

Office Action dated Aug. 27, 2019 for the corresponding Japanese patent application No. 2018-172924.

International Search Report (ISR) and Written Opinion dated Oct. 3, 2017 in International (PCT) Application No. PCT/JP2017/028519.

Allowed Claims from parent U.S. Appl. No. 15/854,797, filed Dec. 27, 2017.

Office Action dated May 22, 2018 for the corresponding Japanese patent application No. 2018-021507.

"Multi-task single lens for automotive vision applications"—Author—Patrice Roulet, Pierre Konen, Simon Thibault Proc. SPIE 7314, Photonics in the Transportation Industry: Auto to Aerospace 11, 731409 (Published on Apr. 29, 2009); doi: 10.1117/12.821296 (Year: 2009).

\* cited by examiner

FIG. 1
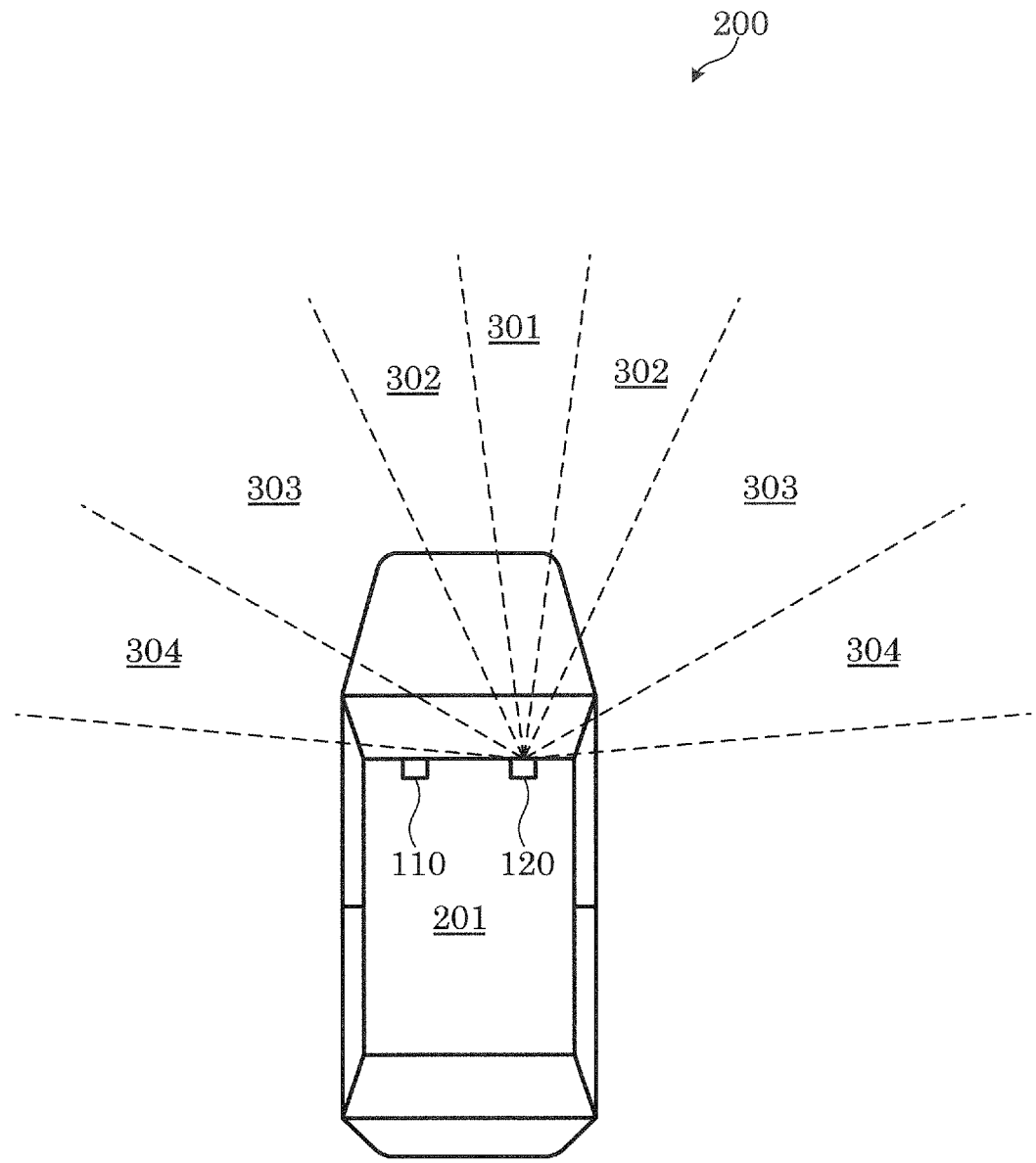
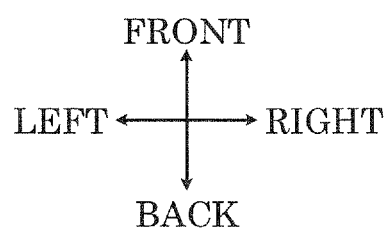

| APPLICATION | REQUIRED ANGLE OF VIEW (deg) | DISTANCE TO BE MEASURED (m) | ERROR | HORIZONTAL PIXEL ALLOCATION (pix) |
|---|---|---|---|---|
| FIRST REGION (FOLLOW FRONT VEHICLE) | 15 | 160 | ±5% | 750 |
| SECOND REGION (EMERGENCY BRAKE FOR FRONT VEHICLE) | 50 | 80 | ±5% | 880 |
| SIXTH REGION (EMERGENCY BRAKE FOR PEDESTRIAN/BICYCLE) | 120 | 8 | ±5% | 200 |
| SEVENTH REGION (CROSS TRAFFIC ALERT) | 155 - 170 | 5 | ±5% | 90 |

IMAGING DEVICE

CROSS REFERENCE TO RELATED APPLICATIONS

This application is a continuation of U.S. patent application Ser. No. 15/854,797 filed on Dec. 27, 2017, which is a continuation-in-part of PCT International Patent Application Number PCT/JP2017/028519 filed on Aug. 7, 2017, claiming the benefit of priority of Japanese Patent Application Number 2016-158786 filed on Aug. 12, 2016, the entire contents of which are hereby incorporated by reference.

BACKGROUND

1. Technical Field

The present disclosure relates to an imaging device.

2. Description of the Related Art

Japanese Unexamined Patent Application Publication No. 59-015239 discloses a method and a device for obtaining an image with a higher resolution by distorting a portion of an optical system that forms an image onto a photosensitive film so that the distorted portion has a higher resolution, and for reproducing a similar image by use of a complementary optical system at the time of image reproduction.

SUMMARY

Imaging devices themselves are costly, which is a big challenge. Moreover, because of the difficulty of providing space for mounting imaging devices that include data transmission lines, the appearance of a vehicle is impaired and the reduction in its weight is also inhibited. Meanwhile, it is difficult for the conventional art, which simply distorts a part of a spherical lens spherically to obtain a locally high resolution image, to flexibly respond to the needs for obtaining image data of a wide range and accurately measuring the distance to an object in front.

The following discloses an imaging device implemented in a distance measurement system utilizing a free-form surface lens that is capable of providing a plurality of regions with desired resolutions such that the system can measure the distance to a target object for each of the regions with a desired accuracy, and also discloses a mobile object system that includes such distance measurement system.

The imaging device according to one aspect of the present disclosure includes an imaging element in which a plurality of imaging pixels are arranged in matrix; and an optical system that forms an image of a predetermined region on an imaging surface of the imaging element. The optical system includes a free-form surface lens having a rotationally asymmetric shape that forms the image on the imaging surface such that a resolution of a first region in front of the predetermined region is higher than a resolution of a second region at a lateral side of the predetermined region, each of the resolutions being a ratio of the number of imaging pixels, among the imaging pixels, used to pick up an image included in per unit angle of view to a total number of the imaging pixels. The free-form surface lens has a shape that forms the image such that a resolution of a portion at a predetermined first distance away from a center of the first region in a vertical direction is different from a resolution of a portion at the predetermined first distance away from the center of the first region in a horizontal direction, the vertical direction being orthogonal to the horizontal direction, in the imaging element, in which the first region and the second region are aligned.

The imaging device according to one aspect of the present disclosure includes an imaging element in which a plurality of imaging pixels are arranged in matrix; and an optical system that forms an image of a predetermined region on an imaging surface of the imaging element. The optical system includes a free-form surface lens having a rotationally asymmetric shape, and has a resolution which is a ratio of the number of imaging pixels, among the imaging pixels, used to pick up an image included in per unit angle of view to a total number of the imaging pixels. The free-form surface lens has a shape that forms the image such that a resolution asymmetrically varies relative to a center of an entire angle of view of the first region in a vertical direction, the vertical direction being orthogonal to a horizontal direction, in the imaging element, in which the first region in front of the region and the second region at a lateral side of the region are aligned.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a diagram showing regions with different resolutions, on a horizontal plane, of an imaging device mounted on a vehicle;

DETAILED DESCRIPTION OF THE EMBODIMENT

The following describes an embodiment of an imaging device implemented in a distance measurement system and a mobile object system according to one aspect of the present disclosure with reference to the drawings. Note that the embodiment described below is only an example of the distance measurement system and the mobile object system of the present disclosure. Therefore, the scope of the present disclosure is limited by the language recited in claims with reference to the following embodiment, and thus is not limited only to the following embodiment. Of the structural components described in the following embodiment, those components not recited in any one of the independent claims that indicate the broadest concepts of the present disclosure are not necessarily required to achieve the object of the present disclosure, and thus are described as structural components for achieving a more preferred mode.

Also note that the accompanied drawings are schematic illustration that includes, where necessary, emphasis, omission, and ratio adjustment for the present disclosure, and thus that the illustration may differ from the actual shape, positional relationship, and ratio.

FIG. 1 is a diagram showing regions with different resolutions, on a horizontal plane, of an imaging device mounted on a vehicle. Note that to circumvent the complexity, FIG. 1 illustrates by broken lines regions with different resolutions of only a single imaging device, but another imaging device also includes regions with different resolutions.

Figure 2:
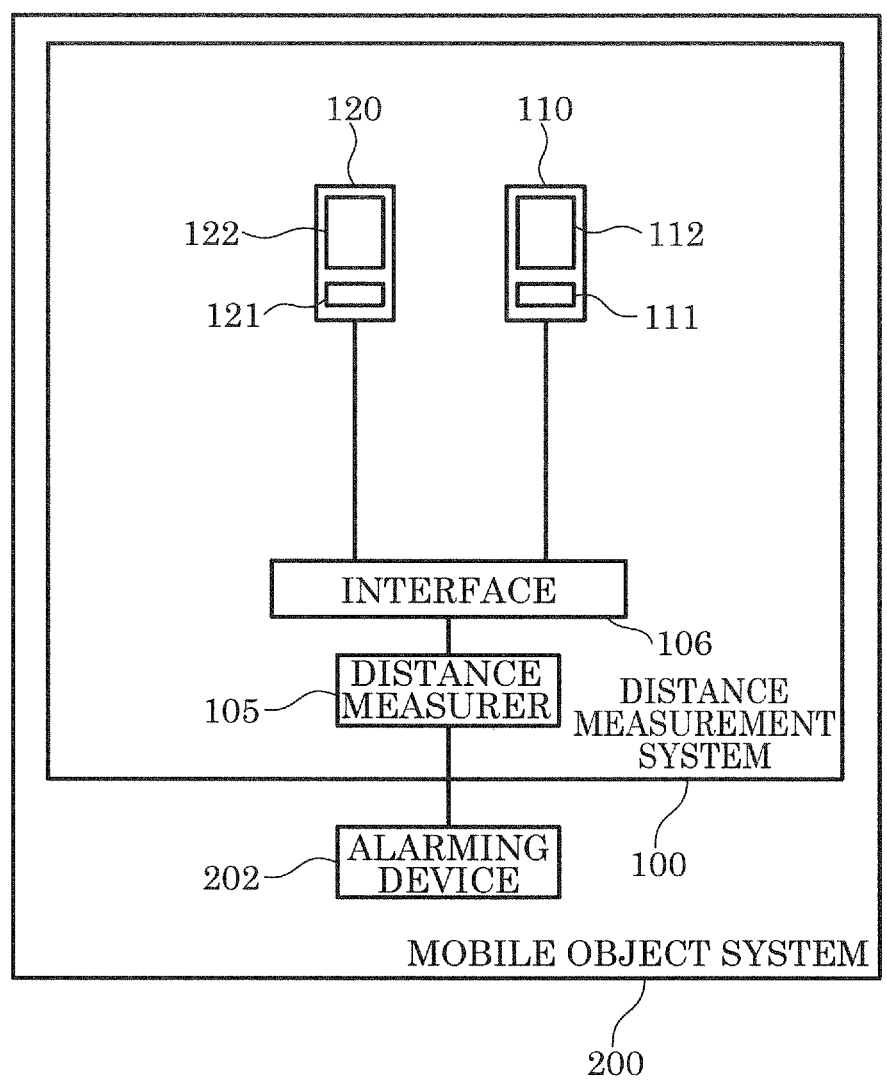
FIG. 2 is a block diagram showing a mechanism section and a functional section of a mobile object system.

FIG. 2 is a block diagram showing the mechanism section and the functional section of the mobile object system.

As illustrated in FIG. 1 and FIG. 2, mobile object system 200, which is mounted on mobile object 201, includes distance measurement system 100. Mobile object system 200 is a system capable of obtaining, as image data, an image of a region in front of mobile object 201 in a normal travel direction and determining the distance to a target object in the image on the basis of the obtained image data. Mobile object system 200 includes mobile object 201, an imaging device, distance measurer 105, and alarming device 202. The imaging device according to the present embodiment includes first imaging device 110 and second imaging device 120.

[Mobile Object 201]

Mobile object 201 is a machine that travels in a space with the imaging device onboard. Examples of mobile object 201 according to the present embodiment include a vehicle such as an automobile that travels on a road with a person onboard.

[Imaging Device]

The imaging device is a device that is mounted on a front side of mobile object 201 (e.g., a top portion inside the windshield) in a normal travel direction. The imaging device is capable of converting into image data an image of an object included in a region in front of mobile object 201 such as an automobile in front. The imaging device includes imaging elements and optical systems. Distance measurement system 100 included in mobile object system 200 according to the present embodiment includes, as the imaging device, first imaging device 110 and second imaging device 120 that are disposed, spaced apart by a distance selected from the range between 100 mm and 500 mm, inclusive, in a horizontal direction (the right-left direction in the drawings). Distance measurement system 100 determines the distance to a target object on the basis of parallax of first imaging device 110 and second imaging device 120.

[Imaging Elements]

The imaging elements are elements capable of converting into image data an image optically formed on an imaging surface, by use of a plurality of imaging pixels arranged in matrix. Examples of the imaging elements include CMOS imaging sensors and CCD imaging sensors. Each imaging device according to the present embodiment includes, as the imaging elements, first imaging element 111 and second imaging element 121.

In the present embodiment, each imaging element is a 2M sensor with an aspect ratio of 16:9. The number of imaging pixels arranged in the vertical direction (the top-bottom direction in the drawings) is 1080, and the number of imaging pixels arranged in the horizontal direction (the right-left direction in the drawings) is 1920.

Note that the imaging elements according to the present embodiment are not limited to the foregoing aspect ratio and number of imaging pixels, and thus any aspect ratio and any number of imaging pixels may be employed.

[Optical Systems]

Each optical system is a system for forming an image of a predetermined region on an imaging surface of each imaging element. Each optical system is formed of a combination of a plurality of lenses, a diaphragm, and a filter. At least one of the plurality of lenses included in the optical systems is a free-form surface lens. Each imaging device according to the present embodiment includes, as the optical systems, first optical system 112 and second optical system 122.

The following more specifically describes the optical systems, taking up second optical system 122 as an example. First optical system 112 works in the similar manner as second optical system 122.

Figure 3:
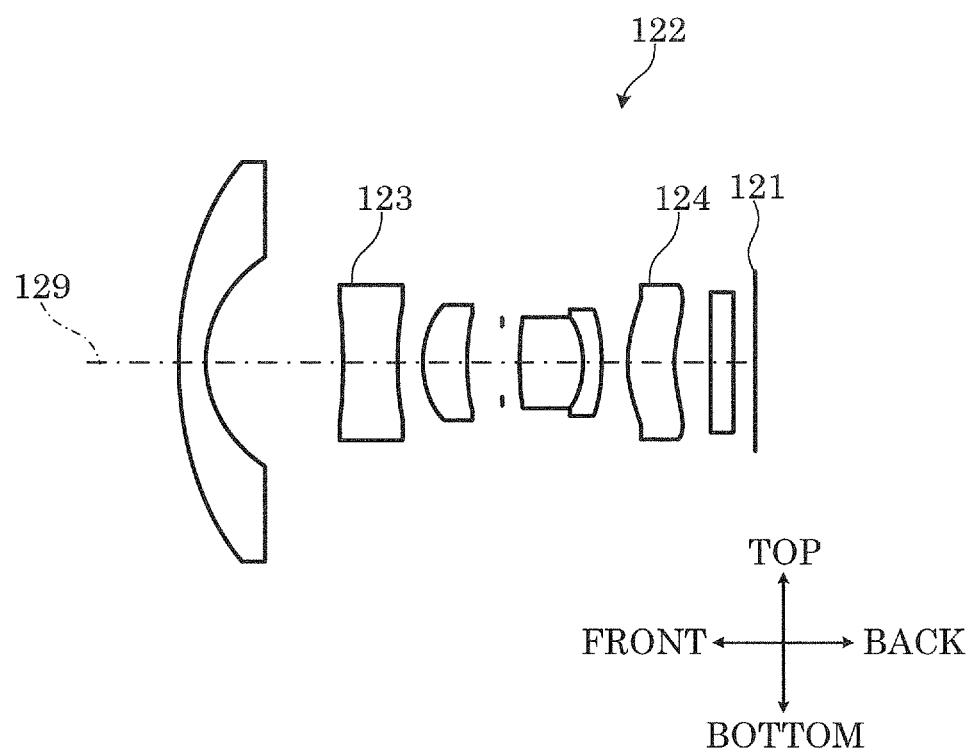
FIG. 3 is a diagram showing a cross-section of a second optical system virtually cut along a vertical plane that includes a second optical axis.

FIG. 3 is a diagram showing a cross-section of second optical system 122 virtually cut along a vertical plane that includes the second optical axis.

Figure 4:
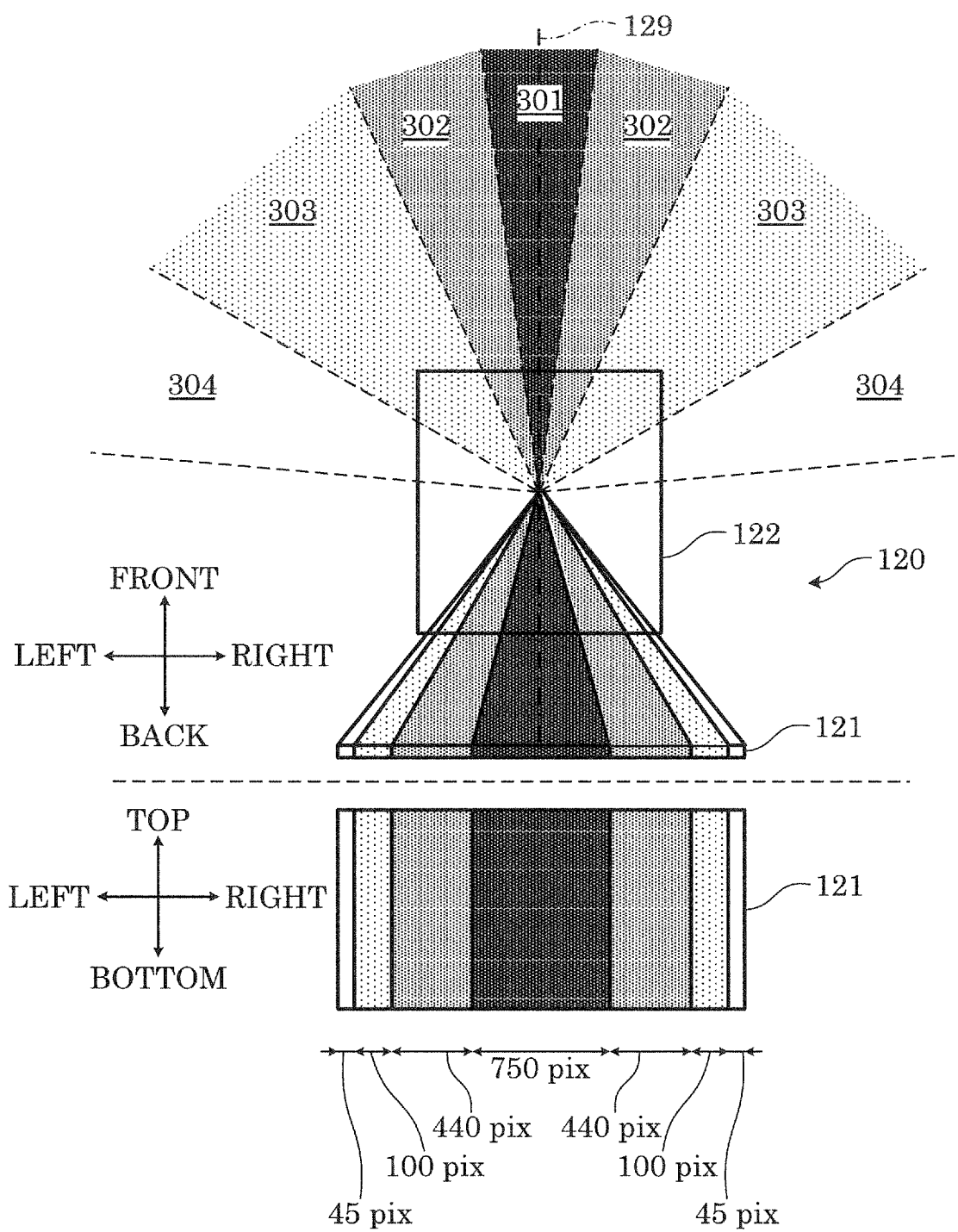
FIG. 4 is a diagram illustrating resolutions, using the second optical system.

FIG. 4 is a diagram illustrating the respective resolutions, using second optical system 122.

Figures 5, 6:
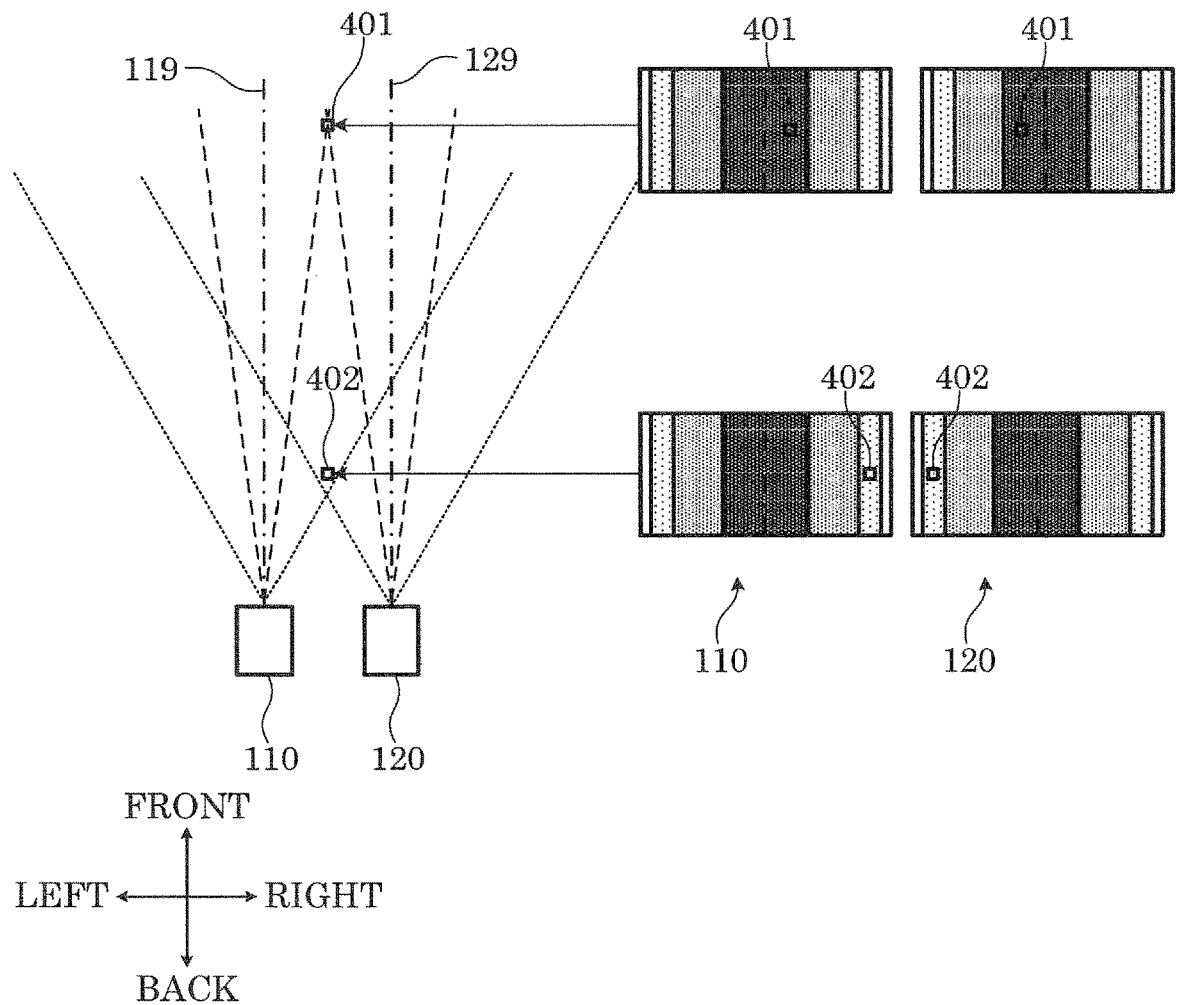
FIG. 5 is a diagram explaining a distance to be measured, an error, and pixel allocation for each horizontal angle of view on an application-by-application basis using the second optical system.
FIG. 6 is a diagram schematically showing an example method of measuring distances.

FIG. 5 is a diagram explaining a distance to be measured, an error, and pixel allocation for each horizontal angle of view on an application-by-application basis using second optical system 122.

The present embodiment sets the angle of view, the distance to be measured, and the error for each application, and specifies feasible resolutions, on the basis of the assessment test scheduled to be introduced by Japan New Car Assessment Program and of performance requirements for autonomous driving currently discussed internationally.

As shown in FIG. 3, FIG. 4, and FIG. 5, second optical system 122 is a system that forms, on an imaging surface of second imaging element 121, an image included in a region in front of mobile object 201. Second optical system 122 according to the present embodiment is a lens known as a wide-angle lens, the horizontal angle of view of which is selected from within the range between 160° and 180°, inclusive.

Second optical system 122 further includes a set of free-form surface lenses 123 and 124, each having a shape that enables regions with different resolutions to be included, i.e., first region 301, second regions 302, sixth regions 303, and seventh regions 304. Free-form surface lenses 123 and 124 employed by the present embodiment each have a shape with which the resolutions of first region 301 to seventh regions 304 decrease in this order in a stepwise fashion.

Second optical system 122 is capable of forming, on an imaging surface of second imaging element 121, an image of a rectangular region in front, with the least distortion in the original rectangular shape.

Here, the term "resolution" refers to a ratio of the number of imaging pixels used to pick up an image included in per unit angle of view of 1° to the total number of imaging pixels.

More specifically, in the case of the present embodiment, the horizontal angle of view of first region 301 is 15°, and an image included in such angle of view is picked up using the number of horizontal imaging pixels of 750. The total number of horizontal imaging pixels is 1920, and thus the resolution is (750/1920)×100/15=2.6

The angle of view of second regions 302 is 17.5° for both the left and right sides of first region 301, which amounts to 35° in total. An image included in this angle of view is picked up using the number of horizontal imaging pixels of 880. The total number of horizontal imaging pixels is 1920, and thus the resolution is (880/1920)×100/35=1.3.

The angle of view of sixth regions 303 is 35° for both the left and right sides of second regions 302, which amounts to 70° in total. An image included in this angle of view is picked up using the number of horizontal imaging pixels of 200. The total number of horizontal imaging pixels is 1920, and thus the resolution is (200/1920)×100/70=0.15.

The angle of view of seventh regions 304 is 25° for both the left and right sides of sixth regions 303, which amounts to 50° in total. An image included in this angle of view is picked up using the number of horizontal imaging pixels of 90. The total number of horizontal imaging pixels is 1920, and thus the resolution is (90/1920)×100/50=0.1.

First region 301 enabled by second optical system 122 including free-form surface lenses 123 and 124 includes second optical axis 129. First region 301 is symmetric with respect to second optical axis 129 on a horizontal plane.

Here, the optical axis is a virtual line that basically passes through the center of an imaging surface of an imaging element and that is vertical to the imaging surface. In the case where an optical system includes a mirror or a prism that reflects light, the optical axis bends by reflection.

In the present disclosure, that a resolution is high means that when a difference is compared between a resolution achieved by the present embodiment and a resolution achieved by the conventional art that uses a combination of an optical system mainly composed of a spherical lens with a flat imaging element, the resolution achieved by the present embodiment is relatively high. More specifically, when the resolution of a portion farthest from the optical axis and the resolution of a portion near the optical axis are compared between the present embodiment and the conventional art, the resolution achieved by the present embodiment is relatively high.

Note that a free-form surface lens is a lens whose surface on which light refraction takes place for image formation has neither an arc-like shape nor a rotational symmetry (i.e., the free-form surface lens has a rotationally asymmetric shape). Also note that a cylindrical lens is considered as a type of arc-shaped lens, and thus as a lens different from a free-form surface lens. To explain more about a free-form surface lens, second free-form surface lens 123 is taken as an example. Second free-form surface lens 123 has different cross-sectional shapes when virtually cut along a plane (horizontal plane) that includes second optical axis 129 and a first axis (lateral axis) and when virtually cut along a plane (vertical plane) that includes second optical axis 129 and a second axis (vertical axis) that is orthogonal to second optical axis 129 and the first axis. Neither of such cross-sections has an arc-like shape nor forms a part of an exact circle.

Expressed differently, a free-form surface lens having a rotationally asymmetric shape forms an image such that a resolution of a portion at a predetermined first distance away from the center of the first region in a vertical direction is different from a resolution of a portion at the predetermined first distance away from the center of the first region in a horizontal direction. Here, the vertical direction is a direction orthogonal to the horizontal direction in which the first region and the second region, where an image is formed by the free-form surface lens, are aligned in the imaging element on which the image is formed by the optical system including the free-form surface lens.

Non-limiting examples of a material of the free-form surface lenses include a glass and a resin. Also, non-limiting examples of a method of manufacturing the free-form surface lenses include a manufacturing method that uses a mold such as a metal mold to form a free-form surface lens.

[Distance Measurer 105]

Distance measurer 105 determines the distance to a target object on the basis of image data obtained from imaging elements of the imaging devices via interface 106.

FIG. 6 is a diagram schematically showing an example method of measuring distances.

FIG. 7 through FIG. 10 are graphs showing the determination results for the respective regions obtained by distance measurer 105.

As shown in FIG. 6, distance measurer 105 according to the present embodiment determines parallax of a target object from image data obtained by first imaging device 110 and second imaging device 120 that are disposed with a predetermined distance therebetween, and determines the distance to the target object by applying the principle of triangulation.

In so doing, an image of the target object that is positioned far in front of mobile object 201 (hereinafter front target object 401) and that is included within an angle of view of 15° or less can be captured in first region 301 with a high resolution, enabling parallax to be determined with a high degree of accuracy. For this reason, the present disclosure achieves distance measurement with a higher degree of accuracy than the distance measurement that uses an optical system including a spherical lens. Stated differently, the present disclosure captures an image within a narrow angle of view by use of a larger number of imaging pixels than those used for another region, which results in reduced parallax errors and thus in a higher measurement accuracy.

This is achieved by decreasing the resolution for the measurement of the distance to target object 402 positioned at a lateral side of mobile object 201.

Figure 7:
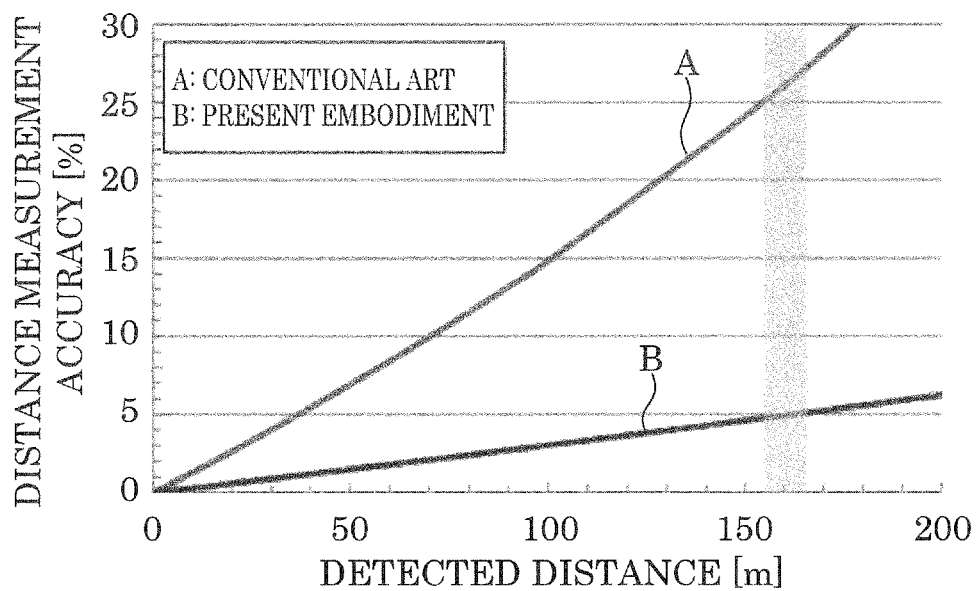
FIG. 7 is a graph showing a determination result for a first region obtained by a distance measurer.

More specifically, when the distance between first optical axis 119 of first imaging device 110 and second optical axis 129 of second imaging device 120 is 240 mm, and the pixel resolution of the parallax determined by distance measurer 105 is 0.1, an image of front target object 401 within an angle of view of 15° or less can be captured in first region 301. As a result, as shown in FIG. 7, in the case of measuring the distance to a target object positioned 160 m away from mobile object 201, the distance measurement accuracy of the present embodiment is ±5%, while the distance measurement accuracy of the conventional art using a spherical lens is ±26%. Stated differently, the present embodiment is capable of measuring the distance to the target object positioned 160 m away from mobile object 201 with a resolution of 8 m, which equates to 5% of the distance to the target object.

Figure 8:
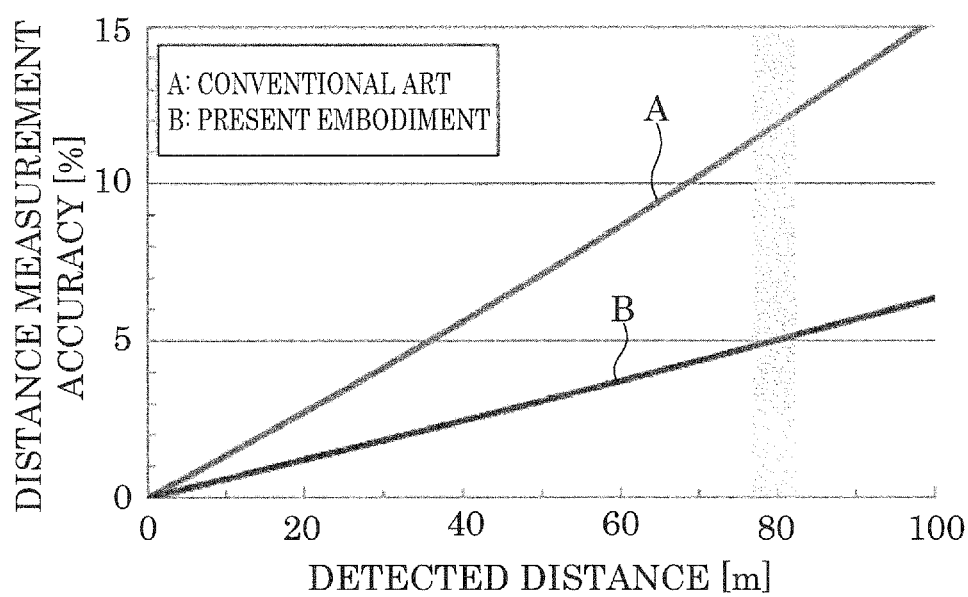
FIG. 8 is a graph showing a determination result for second regions obtained by the distance measurer.

Similarly, an image of a target object within an angle of view of 15° to 50° can be captured in second regions 302. As a result, as shown in FIG. 8, in the case of measuring the distance to a target object positioned 80 m away from mobile object 201, the distance measurement accuracy of the present embodiment is ±5%, while the distance measurement accuracy of the conventional art using a spherical lens is ±12%. Stated differently, the present embodiment is capable of measuring the distance to the target object positioned 80 m away from mobile object 201 with a resolution of 4 m, which equates to 5% of the distance to the target object.

Figure 9:
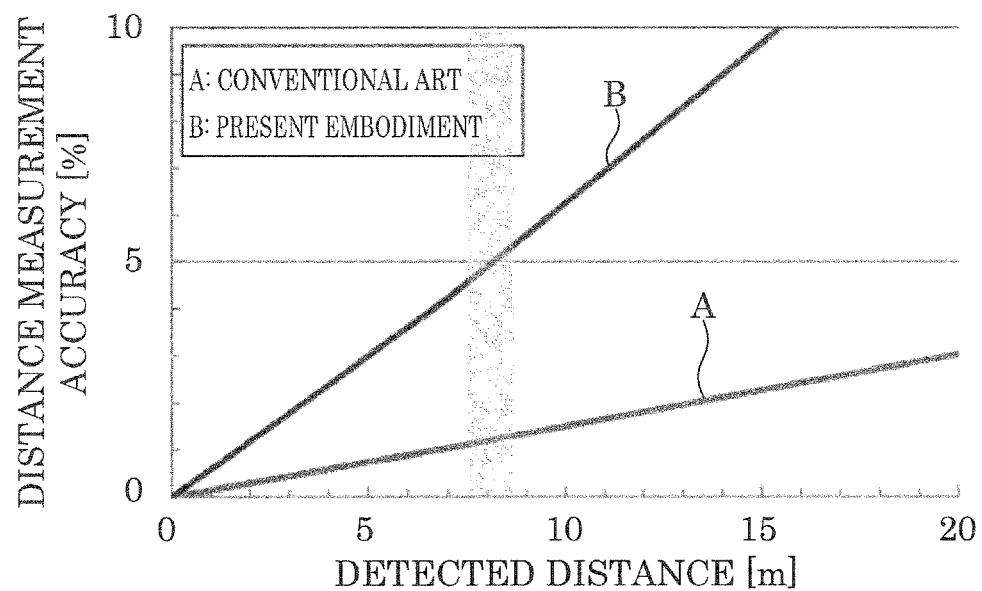
FIG. 9 is a graph showing a determination result for sixth regions obtained by the distance measurer.

Similarly, an image of a target object within an angle of view of 50° to 120° can be captured in sixth regions 303. As a result, as shown in FIG. 9, in the case of measuring the distance to a target object positioned 8 m away from mobile object 201, the distance measurement accuracy of the present embodiment is ±5%, while the distance measurement accuracy of the conventional art using a spherical lens is ±1.2%. Stated differently, the present embodiment is capable of measuring the distance to the target object positioned 8 m away from mobile object 201 with a resolution of 0.4 m, which equates to 5% of the distance to the target object.

Figure 10:
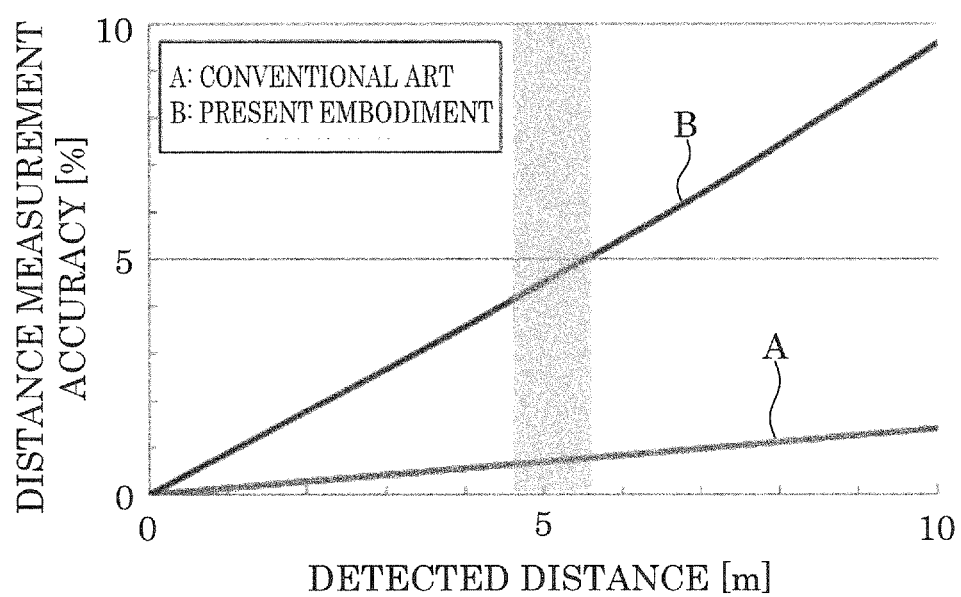
FIG. 10 is a graph showing a determination result for seventh regions obtained by the distance measurer.

Similarly, an image of a target object within an angle of view of 120° to 170° can be captured in seventh regions 304. As a result, as shown in FIG. 10, in the case of measuring the distance to a target object positioned 5 m away from mobile object 201, the distance measurement accuracy of the present embodiment is ±5%, while the distance measurement accuracy of the conventional art using a spherical lens is ±0.7%. Stated differently, the present embodiment is capable of measuring the distance to the target object positioned 5 m away from mobile object 201 with a resolution of about 0.25 m, which equates to 5% of the distance to the target object.

As described above, distance measurement system 100 according to the present embodiment includes free-form surface lenses each having a shape that enables the distance to a target object positioned in front of the imaging region to be measured with a higher degree of accuracy, by lowering the measurement accuracy of the distance to a target object positioned at a lateral side of the imaging region.

Stated differently, distance measurement system 100 according to the present embodiment includes the free-form surface lenses each having a shape that enables the distance measurement accuracy for a farther target object positioned in front and the distance measurement accuracy for a nearby target object positioned at a lateral side to be the same degree of accuracy.

This enables a highly accurate measurement of the distance to a target object positioned within a travel route of mobile object 201 that is travelling straight, even in the case where such target object is positioned far from mobile object 201. This allows for an accurate grasp of the situation of a place distant from mobile object 201 and thus for an early execution of control for circumventing an accident such as a collision. Meanwhile, the same imaging devices are also capable of detecting another mobile object or a person that is possible to enter the traveling route of mobile object 201 from a region outside of the travelling route. The same imaging devices are also capable of detecting an obstacle positioned in a curving direction of mobile object 201.

[Alarming Device 202]

Alarming device 202 is a device that notifies mobile object 201 of information on the basis of the distance to a target object determined by distance measurer 105.

For example, alarming device 202 notifies mobile object 201 of information, as data, that alerts mobile object 201 to increase the speed when the distance to a mobile object in front exceeds a predetermined range, while notifying mobile object 201 of information, as data, that alerts mobile object 201 to decrease the speed when the distance to the mobile object in front is less than the predetermined range.

This allows for accurate control of mobile object 201 such that mobile object 201 can follow a vehicle in front while keeping a safe distance to such vehicle.

Non-limiting examples of a method by which alarming device 202 gives information to a driver of mobile object 201 include a method by which an audible alert is given through a speaker, and a method by which a visible alert in the form of a warning mark, for example, is displayed on the screen of a vehicle navigation system or on a head up display (HUD).

As describe above, the shape of the free-form surface lenses employed by distance measurement system 100 and mobile object system 200 enables to obtain image data of a wide region using a reduced number of imaging devices mounted on mobile object 201 and to accurately measure the distance even to an object positioned far from mobile object 201 by increasing the resolution of an image in a region in a desired direction to be higher than the resolution of an image in another region.

Note that the present disclosure is not limited to the foregoing embodiment. For example, an embodiment achieved by combining any of the structural components described in the present specification or an embodiment achieved by eliminating one or more of the structural components described in the present specification may serve as an embodiment of the present disclosure. Moreover, the present disclosure also includes variations achieved by making various modifications to the present embodiment that can be conceived by those skilled in the art without departing from the essence of the present disclosure, i.e., the meaning of the language recited in claims.

The foregoing embodiment presents the specific values of the resolutions, but the resolutions are not limited to the presented values, and thus may be the values within the below-described range.

The resolution of first region 301 may be selected from among the values equal to or greater than 2, the resolution of second regions 302 from among the values equal to or greater than 0.7 and less than 2, the resolution of sixth regions 303 from among the values equal to or greater than 0.13 and less than 0.7, and the resolution of seventh regions 304 from among the values greater than 0 and less than 0.13. Here, a boundary value between first region 301 and second regions 302 is set to 2, which is an approximately median value of 2.6 and 1.3, being the resolutions of first region 301 and second regions 302, respectively, described in the present embodiment. A boundary value between second regions 302 and sixth regions 303 is set to 0.7, which is an approximately median value of 1.3 and 0.15, being the resolutions of second regions 302 and sixth regions 303, respectively, described in the present embodiment. A boundary value between sixth regions 303 and seventh regions 304 is set to 0.13, which is an approximately median value of 0.15 and 0.1, being the resolutions of sixth regions 303 and seventh regions 304, respectively, described in the present embodiment.

Also, each free-form surface lens is not required to have a shape that provides a constant resolution across each region such as first region 301, and thus may have a shape that enables the resolution to gradually vary within each region.

Also, the foregoing embodiment describes only a difference in resolutions on a horizontal plane, but each free-form surface lens may have a shape that varies not only the resolutions on a horizontal plane but also the resolutions on a vertical plane.

For example, in the case where mobile object 201 is of a type that travels on the ground, a portion at or above a predetermined elevation angle and a portion at or above a predetermined depression angle correspond to the sky and a road surface, respectively. To cope with this, a free-form surface lens with a shape that decreases the resolutions may be employed.

Figure 11:
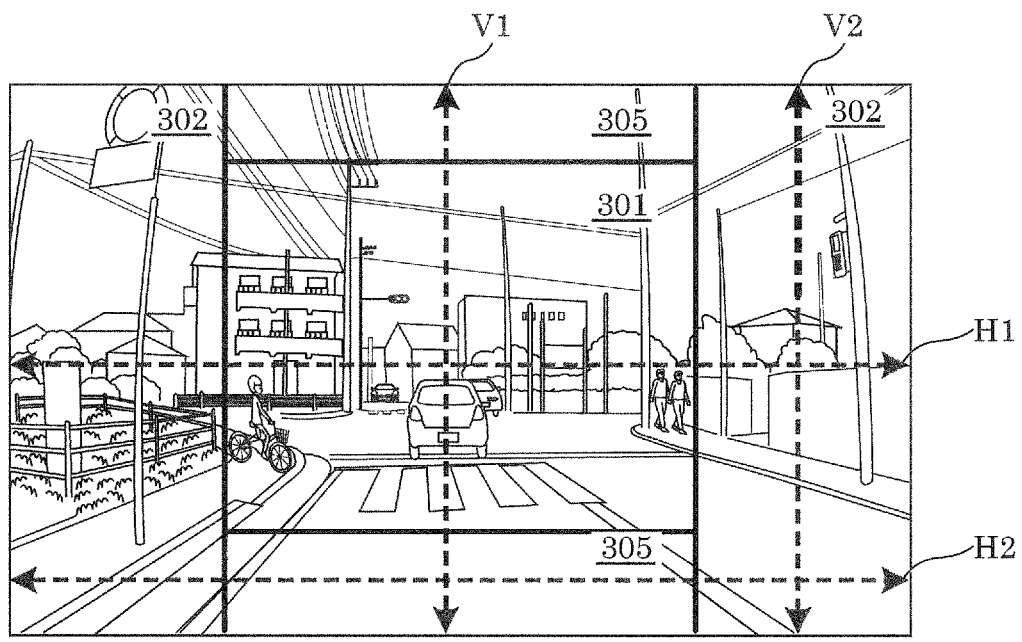
FIG. 11 is a diagram showing an example image formed on an imaging element by an optical system including a free-form surface lens.

More specifically, for example, the rotationally asymmetric shape of the free-form surface lens may be a shape that forms the image such that third region 305 with a resolution less than the resolution of second region 302 is further included adjacent to first region 301 in a vertical direction as shown in FIG. 11. Here, the vertical direction is a direction orthogonal to the horizontal direction in which first region 301 and second region 302, where an image is formed by the free-form surface lens, are aligned in the imaging element on which the image is formed by the optical system including the free-form surface lens. The rotationally asymmetric shape of the free-form surface lens may also be a shape that forms the image such that third region 305 is included at both sides of first region 301 in the vertical direction.

Figure 12:
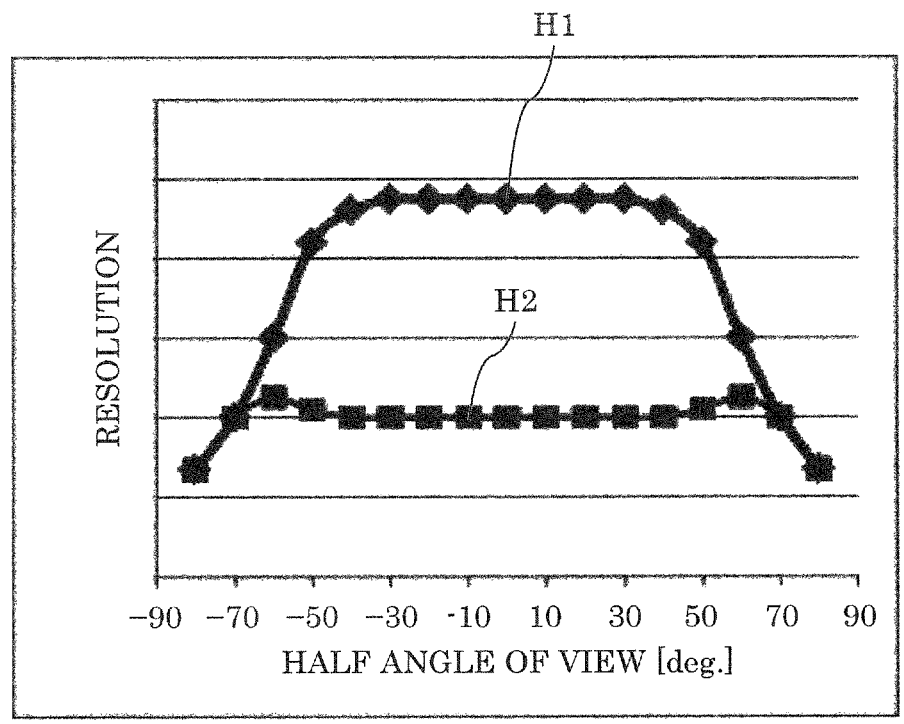
FIG. 12 is a graph showing the resolutions corresponding to horizontal arrows shown in FIG. 11.
Figure 13:
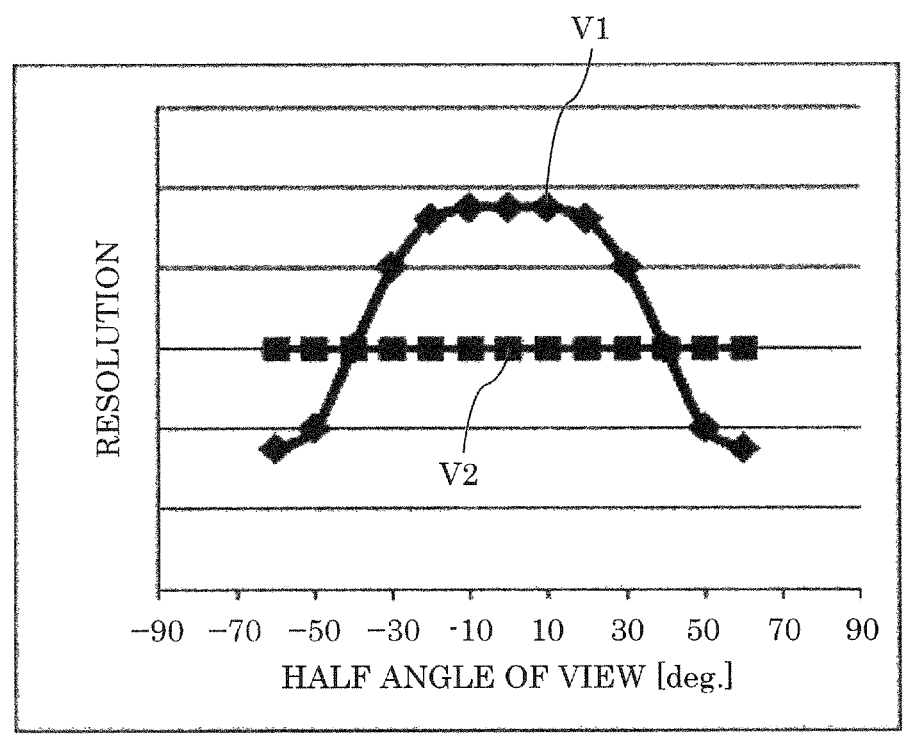
FIG. 13 is a graph showing the resolutions corresponding to vertical arrows shown in FIG. 11.

FIG. 12 is a graph showing a relationship between the resolutions and the respective angles of view corresponding to first horizontal arrow H1 and second horizontal arrow H2, which are horizontal arrows shown in FIG. 11. FIG. 13 is a graph showing a relationship between the resolutions and the respective angles of view corresponding to first vertical arrow V1 and second vertical arrow V2, which are vertical arrows shown in FIG. 11. As shown in these graphs, the line of the graph of FIG. 12 indicating the highest resolution corresponding to first horizontal arrow H1, which passes through the center of first region 301 and extends in the horizontal direction, is in a range between the angles of view of −40° and 40°, whereas the line of the graph of FIG. 13 indicating the highest resolution corresponding to first vertical arrow V1, which passes through the center of first region 301 and extends in the vertical direction, is in a range between the angles of view of −20° and 20°. Stated differently, the length in the horizontal direction and the length in the vertical direction of first region 301 with the same resolution are different. This is achieved by the free-form surface lens having a rotationally asymmetric shape. Meanwhile, the line of the graph of FIG. 13 corresponding to second vertical arrow V2 indicates that the resolution is constant. In other words, second region 302 has an approximately same resolution across the imaging element in the vertical direction, i.e., from one end to the other end of the imaging element. This is also achieved by the free-form surface lens having a rotationally asymmetric shape.

Figure 14:
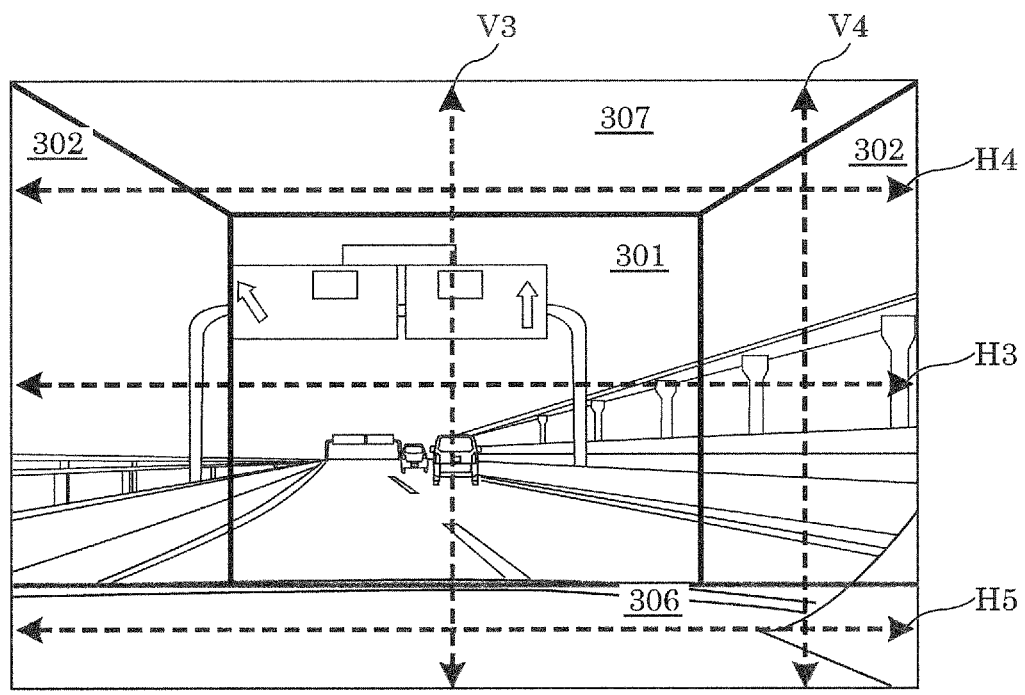
FIG. 14 is a diagram showing an example image formed on an imaging element by an optical system including a free-form surface lens having another shape.

The rotationally asymmetric shape of the free-form surface lens may also be a shape that forms the image such that fourth region 306 with a resolution less than the resolution of second region 302 is included adjacent to second region 302 in the vertical direction and adjacent to first region 301 in the vertical direction as shown in FIG. 14. The rotationally asymmetric shape of the free-form surface lens may also be a shape that forms the image such that fifth region 307 with a resolution less than the resolution of second region 302 is included adjacent to first region 301 and across first region 301 from fourth region 306 in the vertical direction, fifth region 307 being adjacent to second region 302.

Figure 15:
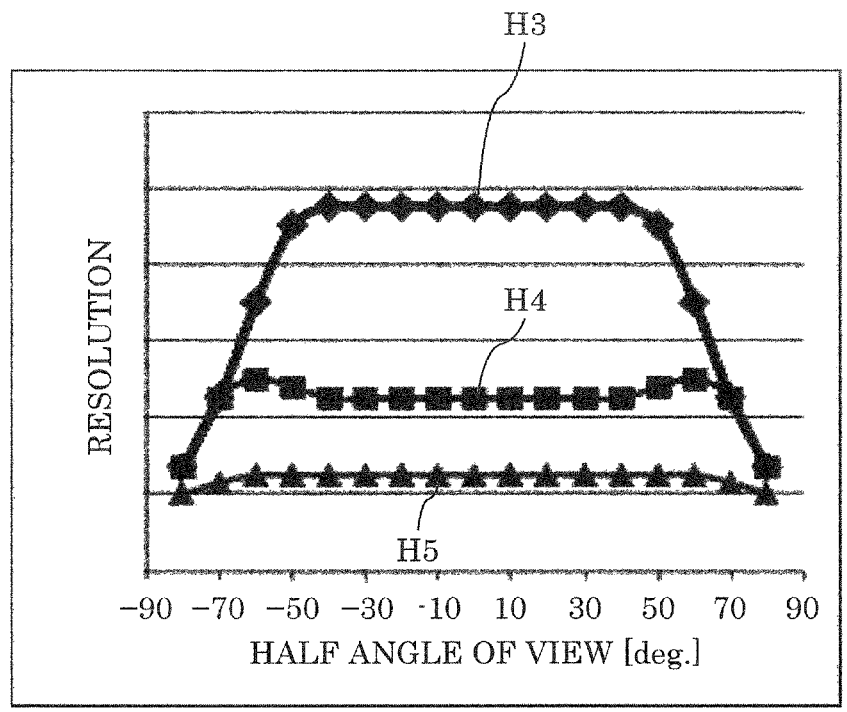
FIG. 15 is a graph showing the resolutions corresponding to horizontal arrows shown in FIG. 14.
Figure 16:
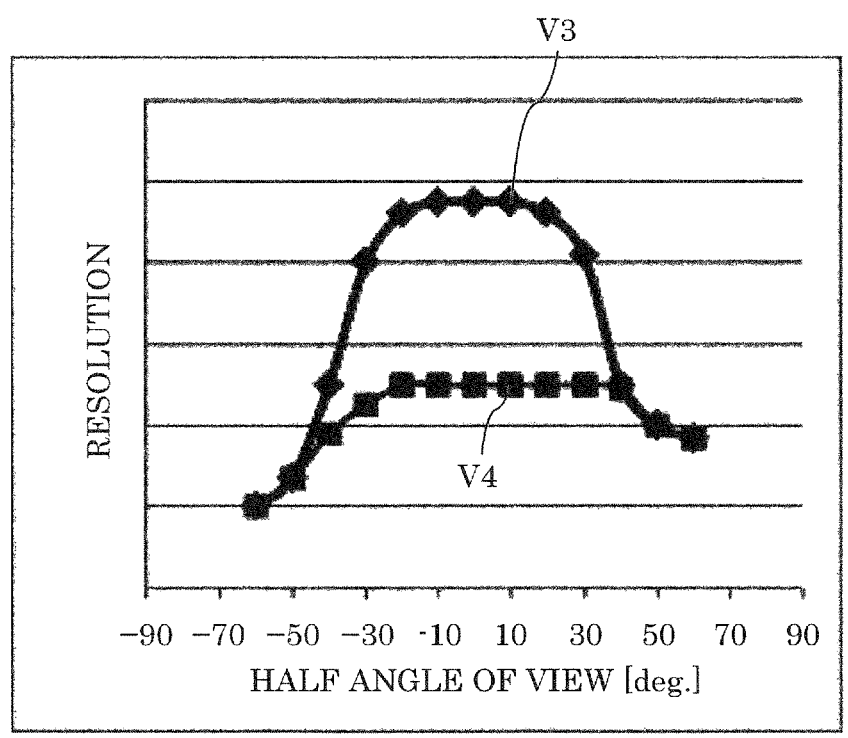
FIG. 16 is a graph showing the resolutions corresponding to vertical arrows shown in FIG. 14.

FIG. 15 is a graph showing a relationship between the resolutions and the respective angles of view corresponding to third horizontal arrow 113, fourth horizontal arrow 114, and fifth horizontal arrow 115, which are horizontal arrows shown in FIG. 14. FIG. 16 is a graph showing a relationship between the resolutions and the respective angles of view corresponding to third vertical arrow V3 and fourth vertical arrow V4, which are vertical arrows shown in FIG. 14. As shown in these graphs, the line of the graph of FIG. 15 corresponding to third horizontal arrow 113, which passes through the center of first region 301 and extends in the horizontal direction, is approximately the same with the line of the graph of FIG. 12 corresponding to first horizontal arrow H1 described above. Also, the line of the graph of FIG. 15 corresponding to third vertical arrow V3, which passes through the center of first region 301 and extends in the vertical direction, is approximately the same with the line of the graph of FIG. 13 corresponding to first horizontal arrow V1 described above.

Also, as shown by the lines of the graph in FIG. 15 corresponding to fourth horizontal arrow H4 and fifth horizontal arrow H5, which are at an approximately same distance away from the center of first region 301 and at the opposing sides with respect to such center, the resolutions of the corresponding portions are different. Stated differently, the free-form surface lens having a rotationally asymmetric shape enables an image to be formed such that the resolutions are different of portions that are at the same distance away from the center of first region 301.

Furthermore, as shown in the graphs of FIG. 15 and FIG. 16, the free-form surface lens having a rotationally asymmetric shape also enables the resolutions to vary such that the line indicating the resolution in the horizontal direction is symmetric with respect to the angle of view of zero, whereas the line indicating the resolution in the vertical direction is asymmetric with respect to the angle of view of zero.

In the case where mobile object 201 is of a type that travels in the air such as a drone that captures an image below the mobile object, a free-form surface lens with a shape that increases the resolution of a portion at or above a predetermined depression angle may be employed.

Although the foregoing embodiment describes an example method of measuring distances by parallax using two imaging devices, the present disclosure is not limited to this example. For example, a single imaging device may be used to measure distances, assuming that the imaging device is mounted on a mobile object, by use of; a distance measurement method by which parallax is determined from images captured at different times; a distance measurement method by which a distance is determined on the basis of a positional relation between a target object and a vanishing point utilizing, for example, white lines; or a distance measurement method utilizing depth form defocus (DFD).

Mobile object 201 may further include: a third imaging device (left-hand side camera), the imaging region of which partially overlaps with that of first imaging device 110; a fourth imaging device (right-hand side camera), the imaging region of which partially overlaps with that of second imaging device 120; and a fifth imaging device (rear camera), the imaging region of which partially overlaps with that of the third imaging device and that of the fourth imaging device. Mobile object 201 may also include a display device that displays, inside mobile object 201, an image of the entire surroundings of mobile object 201 on the basis of image data captured by these imaging devices.

This provides a surroundings monitoring system utilizing the distance measurement system according to the present disclosure.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The distance measurement system and the mobile object system according to the present disclosure are applicable to mobile objects such as: automobiles, aircrafts, and ships that travel with passengers onboard; drones and carrier devices that travel without passengers; and tips of robot arms.

What is claimed is:

1. An imaging device comprising:
   an imaging element in which a plurality of imaging pixels are arranged in matrix; and
   an optical system that forms an image of a predetermined region on an imaging surface of the imaging element;
   wherein the optical system includes a free-form surface lens having a rotationally asymmetric shape that forms the image on the imaging surface such that a resolution of a first region in front of the predetermined region is higher than a resolution of a second region at a lateral side of the predetermined region, each of the resolutions being a ratio of the number of imaging pixels, among the imaging pixels, used to pick up an image included in per unit angle of view to a total number of the imaging pixels,
   wherein the free-form surface lens has a shape that forms the image such that a resolution of a portion at a predetermined first distance away from a center of the first region in a vertical direction is different from a resolution of a portion at the predetermined first distance away from the center of the first region in a horizontal direction, and that a resolution of a portion at a distance above the center of the first region is higher than a resolution of a portion at a same distance below the center of the first region in the vertical direction, the vertical direction being orthogonal to the horizontal direction, in the imaging element, in which the first region and the second region are aligned.

2. The imaging device according to claim 1, wherein a horizontal line passing through the center of the first region includes:
   a first portion having a resolution that matches a resolution of the center of the first region; and
   a second portion having a resolution that decreases with increasing distance from the center of the first region.

3. The imaging device according to claim 1, wherein a vertical line passing through the center of the first region includes:
   a first portion having a resolution that matches a resolution of the center of the first region; and
   a second portion having a resolution that decreases with increasing distance from the center of the first region.

4. The imaging device according to claim 1,
   wherein a region in which the resolution is even in the first region has a length in the horizontal direction different from a length in the vertical direction.

* * * * *